(12) United States Patent
Mohan et al.

(10) Patent No.: US 12,471,901 B2
(45) Date of Patent: Nov. 18, 2025

(54) HAPTIC BASED SYSTEM FOR BONE GAP MEASUREMENT AND DISTRACTION

(71) Applicants: Vivek Mohan, Corona del Mar, CA (US); Robert S. Namba, Corona del Mar, CA (US)

(72) Inventors: Vivek Mohan, Corona del Mar, CA (US); Robert S. Namba, Corona del Mar, CA (US)

(*) Notice: Subject to any disclaimer, the term of this patent is extended or adjusted under 35 U.S.C. 154(b) by 1255 days.

(21) Appl. No.: 17/047,225

(22) PCT Filed: Apr. 11, 2019

(86) PCT No.: PCT/US2019/027093
§ 371 (c)(1),
(2) Date: Oct. 13, 2020

(87) PCT Pub. No.: WO2019/200174
PCT Pub. Date: Oct. 17, 2019

(65) Prior Publication Data
US 2021/0378651 A1    Dec. 9, 2021

Related U.S. Application Data

(60) Provisional application No. 62/656,241, filed on Apr. 11, 2018.

(51) Int. Cl.
*A61B 17/02* (2006.01)
*A61B 17/15* (2006.01)
*A61B 90/00* (2016.01)

(52) U.S. Cl.
CPC .......... *A61B 17/025* (2013.01); *A61B 17/151* (2013.01); *A61B 90/06* (2016.02);
(Continued)

(58) Field of Classification Search
CPC ..... A61B 17/025; A61B 90/06; A61B 17/151; A61B 2090/061; A61B 2090/064; A61B 2017/0256; A61B 2017/0268
See application file for complete search history.

(56) References Cited

U.S. PATENT DOCUMENTS

| 4,566,466 A | 1/1986 | Ripple et al. |
| 5,213,112 A * | 5/1993 | Niwa ............ A61F 2/4657 600/587 |

(Continued)

FOREIGN PATENT DOCUMENTS

| WO | 2005020941 A2 | 3/2005 |
| WO | 2011/128657 A1 | 10/2011 |

OTHER PUBLICATIONS

International Search Report, dated Aug. 22, 2019, PCT/US2019/027093.

(Continued)

*Primary Examiner* — Zade Coley
*Assistant Examiner* — Diana Jones
(74) *Attorney, Agent, or Firm* — Cittone Demers & Arneri LLP; Henry J. Cittone

(57) ABSTRACT

The present invention provides an instrument assembly that is expandable in steps for providing precise measurement of bone gap and distraction of bone in a controlled manner. It discloses a tool performing expandable Bi-Surface Mechanism to expand a bi-compartmental structure. The disclosed system is equipped with two active surfaces (Bottom base and a top plate) between which a force is applied to move the surfaces in relation to each other for providing precise measurement of bone gap and distraction of bone in a controlled manner. Additionally, the control mechanism of the present invention includes applying direct and/or measured/graduated separation force between the two surfaces (Continued)

and able to deliver haptic and sensor-based feedback to the surgeon for the critical ligament tensioning and balancing aspects of the procedure.

16 Claims, 11 Drawing Sheets

(52) U.S. Cl.
CPC ............... *A61B 2017/0256* (2013.01); *A61B 2017/0268* (2013.01); *A61B 2090/061* (2016.02); *A61B 2090/064* (2016.02)

(56) References Cited

U.S. PATENT DOCUMENTS

| | | | |
|---|---|---|---|
| 7,955,356 B2 | 6/2011 | Zucherman et al. | |
| 8,197,489 B2* | 6/2012 | Chessar | A61F 2/4657 606/88 |
| 8,337,508 B2* | 12/2012 | Lavallee | A61B 90/36 606/105 |
| 8,911,448 B2* | 12/2014 | Stein | A61B 5/1036 606/102 |
| 9,277,965 B2 | 3/2016 | Dietz | |
| 2005/0020941 A1 | 1/2005 | Tarabichi | |
| 2006/0111790 A1 | 5/2006 | Dietz | |
| 2008/0021555 A1* | 1/2008 | White | A61F 2/44 623/17.11 |
| 2009/0018544 A1* | 1/2009 | Heavener | A61F 2/4657 606/90 |
| 2009/0222089 A1* | 9/2009 | Hauri | A61F 2/4657 623/13.13 |
| 2010/0249533 A1 | 9/2010 | Pierce et al. | |
| 2014/0135776 A1 | 5/2014 | Huffmaster | |
| 2014/0288563 A1 | 9/2014 | Claypool et al. | |
| 2015/0342588 A1 | 12/2015 | Bechtold et al. | |
| 2017/0112632 A1 | 4/2017 | Dmushewsky | |
| 2018/0317898 A1* | 11/2018 | Plaskos | A61B 17/025 |

OTHER PUBLICATIONS

Written Opinion of the International Search Authority, dated Aug. 22, 2019, PCT/US2019/027093.
IPRP, dated Oct. 13, 2020, PCT/US2019/027093.

\* cited by examiner

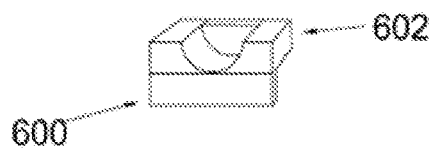
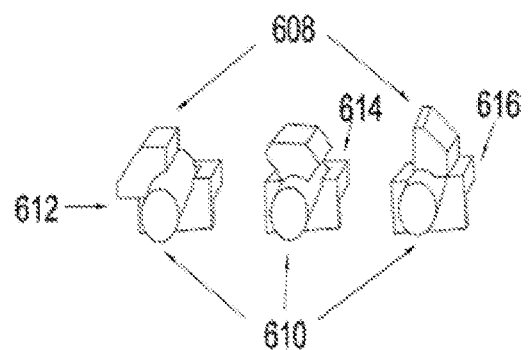
FIG. 6A
FIG. 6B
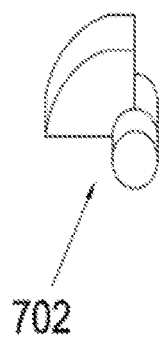
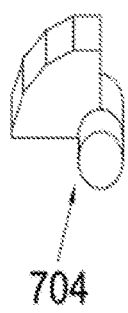
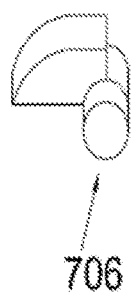
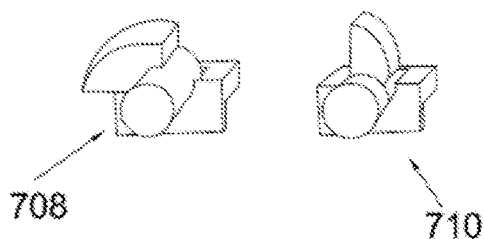
FIG. 7A  FIG. 7B  FIG. 7C  FIG. 7D  FIG. 7E

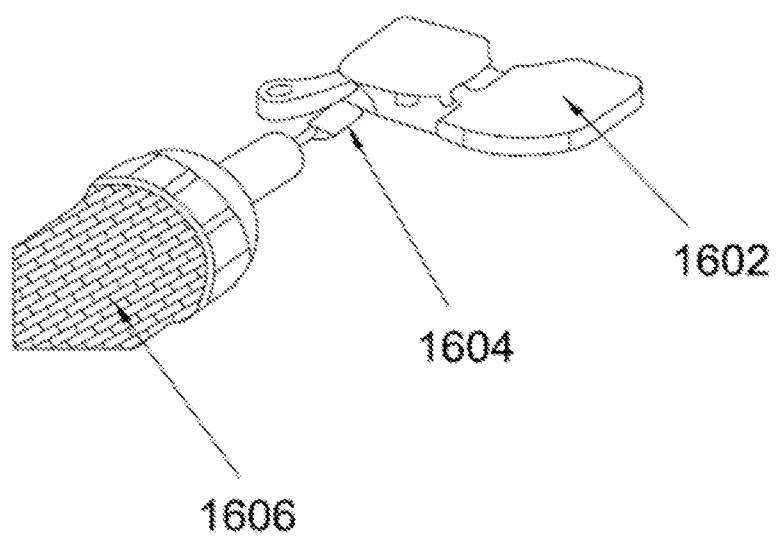
FIG. 16
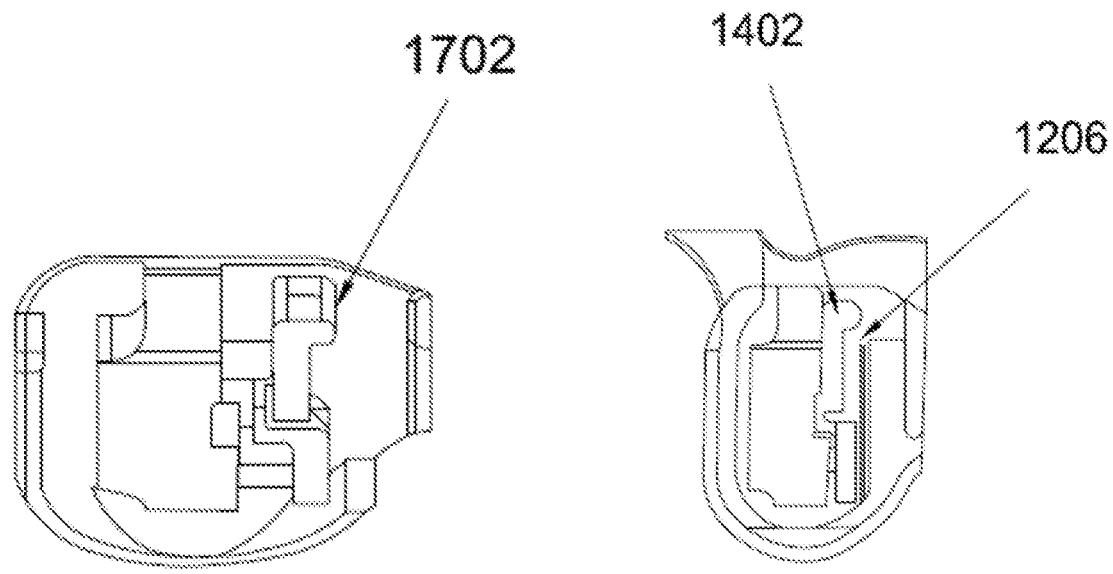
FIG. 17A
FIG. 17B

HAPTIC BASED SYSTEM FOR BONE GAP MEASUREMENT AND DISTRACTION

CROSS-REFERENCE TO RELATED APPLICATION

This Application claims priority to and/or benefit of U.S. Provisional Patent App. No. 62,656,241, filed Apr. 11, 2018, the disclosures of which are incorporated by reference herein in their entirety.

FIELD OF THE INVENTION

The present invention relates to a system for providing haptic-based measurement of the distance between two bony elements, and more particularly, to a device for controlled distraction of the bony elements to a desired or a predetermined length. This subsequently allows for the proper and correct placement of a device or an implant that requires certain mechanical and functional integrity of the bony and soft tissue elements around the anatomical structure undergoing surgical intervention.

BACKGROUND

The human body is comprised of different types of joints. Multiple etiologies can cause degeneration or arthritis with time and age. As the disease process progresses, the bones of the joint may come into direct contact resulting in pain, discomfort and disability. Spinal and joint reconstructive surgery of the upper and lower extremities is a recognized approach to the treatment of these symptoms. For example, Anterior Lumbar Interbody Fusion (ALIF) and Total knee replacement (TKR) are definitive surgical options for the management of degenerative lumbar disc disease and advanced arthritis of the knee joint, respectively. Though very different procedures, they both involve manipulation and 'balancing' of the soft tissue structures connected to the bones.

For illustrative purposes, the spine is divided into three different zones, or columns. Spinal surgical procedures can be performed on either the anterior or posterior columns with the goal, in fusion procedures, being to stabilize adjacent elements, or 'segments' with an eventual bridge of bone, thereby functionally decreasing intersegment motion and/or instability. In another instance, spinal disc replacement surgery involves insertion of a medical device between adjacent vertebral bodies to enable interbody motion. The anterior column includes mainly the intervertebral bodies and associated soft tissue structures, whereas the posterior column includes the posterior ligaments, the laminar structures and facet joints. For anterior column procedures, evaluation of the bone gap between the intervertebral bodies is important for fusion procedures (where a segment of bone or "cage" is inserted) or where an intervertebral disc replacement is placed.

As it pertains to the knee, the joint is comprised of three different articular regions, or compartments, between the femur, the tibia and the patella. Since motion is a critical aspect of ambulation, the goal of total knee replacement surgery is to replace the diseased joint cartilage of the three compartments with prosthetic implants such that they optimize bony fixation and soft tissue function.

A major challenge in the knee replacement surgery is the balancing of ligament tension, especially the medial and lateral collateral ligaments, to provide stability and function with maximal range of the knee motion. Proper ligament balancing can be assessed with measurement of the bone gap between the femoral and tibial surfaces. Errors in gap measurement can produce uneven ligament tension after prosthesis implantation that may lead to pain, stiffness, instability and/or abnormal patellar tracking resulting in failure and subsequent revision (i.e. re-operation) surgery.

Since balance of the soft tissue structures around the spine and knee is critical, the surgical technique(s) currently employed may be further enhanced with the addition and use of simplified instrumentation. The current knee replacement instrumentation available for measuring bone gaps are bulky, cumbersome, and, in some instances, incapable of providing direct measurement of the distance between surfaces. Most systems are not able to deliver haptic feedback to the surgeon for the critical ligament tensioning and balancing aspects of the procedure. Some existing devices, require that the surgeon continuously use one hand to hold the device, positioning the tips of the measuring device between the bone surfaces and squeeze the handle to distract the tips. This makes assessment of the knee ligaments difficult since manual movement of the femur and tibia is required by the surgeon with his other hand. Movement of the knee to assess ligament balance often results in the expulsion of the device out of the knee joint, requiring repeat insertion of the device, squeezing the handle, and manually moving the knee joint again. The cumbersome existing instruments are used only after bone resection has been performed. They cannot be used before removal of bone or with prosthetic implants in place.

For the ligament tension adjustment portion of the operation, if a ligament is deemed to be tight, a surgical release is often performed. Release of a contracted ligament includes removal of bone spurs and graduated surgical 'release' of the attachments of a ligament. Following the release, it can be difficult to assess how much the ligament has been actually relaxed due to soft tissue contractures as well as the bulk and weight of the extremity being replaced. Without a haptic-based feedback, forceful manipulation of the knee joint to realize the extent of relaxation of a released ligament could result in catastrophic ligament rupture, or even tibial or femoral fracture.

There is, therefore, no existing effective tool(s) available that provide controlled and gradual distraction of the bone surfaces under direct haptic-feedback during and after surgical release of the ligaments. There also exists a need for an effective tool that is easily inserted into bone gaps to allow precise assessment of ligament tension and distract the bones in controlled manner in both flexion and extension. Additionally, there is a need to assess bone gaps between knee surfaces in the native knee before bone resection, after bone resection and with either trial or definitive TKR implants in place.

The bony and soft tissue aspects mentioned above for the spine and the knee may be applied to all small and large joint surgeries in the axial and appendicular skeleton. Cervical, thoracic and lumbosacral surgical procedures have objectives similar to lumbar fusions or disc replacement. Joint replacement surgeries of the shoulder (glenohumeral arthroplasty), elbow (radial head humero-ulnar replacement), wrist (radiocarpal arthroplasty), hip (femoroacetabular replacement) and ankle (tibio-talar arthroplasty) are similarly intended and are subsequently limited by the aforementioned instrumentation issues.

Based on the issues and concerns outlined above, the present invention discloses a system for providing haptic-based precise measurement of the bone gap, or the distance between two bony elements, and more particularly, to a device for the controlled distraction of these elements to a desired or predetermined length, with or without a graduated surgical release of the soft tissue structures between them. This subsequently allows for the proper and correct placement of a device or an implant that requires certain mechanical and functional integrity of the bony and soft tissue structures around the joint undergoing surgical correction.

SUMMARY

The present invention provides a bone gap measuring and haptic-based distraction system for controlled balancing of ligament and soft tissue tensioning during axial or appendicular skeletal surgery. The system is used between two bones with their associated peri-articular (surrounding) soft tissue envelope.

The described system comprises of an insert that is either rotated, levered, or advanced between the bones to achieve the desired action of distraction and soft tissue tensioning. The insert can be either a well-defined geometric or an amorphous non-geometric component.

The geometric inserts are polygons with a defined, predetermined shape that correspond to particular distances between the faces and edges, thereby enabling measurement of the gap distance between the bone surfaces.

The non-geometric inserts are highly variable and may be customized to the particular use-case.

The system also comprises of a handle attached to the insert at an axial or otherwise fixed location for placement into the space between the bone surfaces and to enable its use in either a rotational, levered, or advancement mechanism of action.

In another aspect of the present invention, the insert may be used independently or in conjunction with a grooved baseplate for precise localization within the joint for measurement and graduated haptic feedback. The insert-baseplate system comprises a multi-piece device that enables distraction of bone surfaces in a controlled and graduated fashion thereby achieving tensioning of the soft tissue elements. The distraction system is equipped with a rotatable, leverable, or advanceable insert and a single or bi-grooved platform or baseplate.

A specific use-case scenario may require a non-geometric insert shaped in the semblance of a 'prybar' with a smooth rounded end to avoid bone penetration when used independently for distraction. The prybar insert may optionally have a sliding pivot/swivel bulb at its undersurface that fits into the baseplate groove, wherein the relative arrangements of the sliding pivot/swivel and the baseplate allows the surgeon to control the location of the distraction site and prevent slippage of the fulcrum.

The grooved baseplate that is used may either be uni-railed or bi-railed depending on the joint being operated on and the type of distraction and balancing required. In the specific use-case of a TKR, a medial and lateral bi-railed baseplate permits the deployment of the geometric or non-geometric cam inserts into the joint even when the knee cap is in its anatomical location. In contrast, for a medial or a lateral unicompartmental knee replacement, a uni-railed baseplate would be appropriate.

When used for a Total knee Replacement (TKR) surgery, once equality of tension is achieved in both flexion and extension, the present invention also provides a method to achieve proper rotation of the femoral component. The method comprises of creating a medially and laterally haptically-balanced bone gap in extension, followed by placing the required inserts medially and laterally onto a bi-railed baseplate to recreate that same haptic balance in flexion, with the patella in its anatomical location. Once the flexion-based soft-tissue tensioning is complete, the method applies a modified instrument to the baseplate that reproduces the distraction distance in extension and allows femoral component sizing at that specific distraction distance. Dimensions of commercially available knee replacement instruments are incorporated to allow for rotation of the manufacturer-specific femoral cutting guides.

BRIEF DESCRIPTION OF DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements). In the drawings:

FIGS. 6A and 6B show exemplary configuration of insert with a combination of quarter polygon and a cylinder to be used with a baseplate for bone gap measurement and bone gap distraction system in accordance with an embodiment of present invention.

FIG. 7A-7E show alternative embodiment wherein the attachment to the cylinder is cam shaped.

FIG. 16 illustrates application of an insert to the bone distraction device for linear expansion in accordance with an embodiment of the present invention.

FIGS. 17A and 17B illustrates a locking mechanism and a gap-loosening mechanism in accordance with an embodiment of the present invention.

DESCRIPTION

Figure 1:
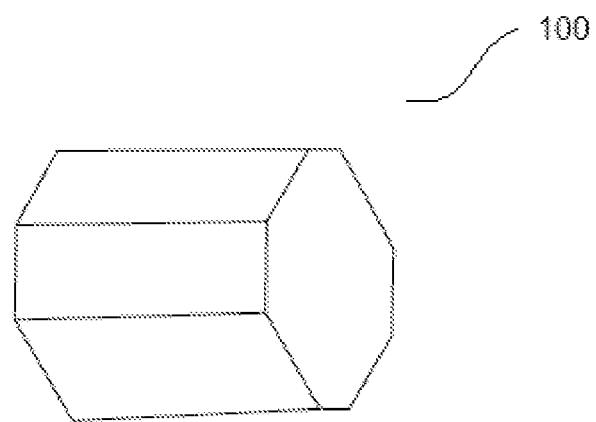
FIG. 1 illustrates a geometric polygonal insert with different gap widths or distances between the three sets of opposing parallel faces, in accordance with an embodiment of the present invention.

In the following detailed description of embodiments of the invention, numerous specific details are set forth in order to provide a thorough understanding of the embodiment of invention. However, it will be obvious to a person skilled in art that the embodiments of invention may be practiced with or without these specific details. In other instances well known methods, procedures and components have not been described in details, so as not to unnecessarily obscure aspects of the embodiments of the invention.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Generally, successful orthopedic surgery including the implantation of an orthopedic device into the muscular-skeletal system depends on multiple factors like precise measurement of distance between two bony elements, maintaining adequate alignment of the extremity or implanted device to the ideal, proper seating of an implant for stability, loading on the skeletal system or replacement implant and alignment of implanted components in relation to one another.

The basic system being described has multiple components with different configurations and embodiments that may be used either independently, in conjunction/combination with each other, or in conjunction/combination with other manufacturers' instrumentation.

In an embodiment of present invention, the present invention provides a bone gap measuring and haptic-based distraction system for controlled balancing of ligament and soft tissue tensioning during axial or appendicular skeletal surgery. The system is used between two bones with their associated peri-articular (surrounding) soft tissue envelope. The described system comprises of an insert that is either rotated, levered, or advanced between the bones to achieve the desired action of distraction and soft tissue tensioning. The insert can be either a well-defined geometric or an amorphous non-geometric component.

In an embodiment, the first component of the system is an insert that allows for measuring and/or altering the distance between two different bony elements attached to each other with a variety of different soft tissue restraints. The insert is a three dimensional structure which when placed between two different bony elements can be rotated, levered or advanced between the gaps using a handle attached to the insert at fixed location. The handle is the second component of the system which facilitates the bone gap measurement and controlled distraction of bone elements by providing rotational, lever effects and advancement to the insert. The shape of the insert can either be a uniform cross-section shape resulting in (i) an angular, edged, multi-faced geometric body, or (ii) a curved, non-edged, non-geometric body. Another embodiment of the insert is one with variation in its cross-sectional shape along its longitudinal axis. For all inserts, the amount of distraction between the bony elements is determined by the distance between the faces, edges or instantaneous point of contact with the top and bottom bone. The inserts can either be rotated, levered, or advanced further between both bone elements to allow for the function of measuring and controlled distraction.

Geometric Insert

The geometrical shaped inserts have a well define shape and have defined faces, edges and angular cross-sectional geometries, such as polygons and curves. A simple geometrical insert is a geometrically shaped polygon with all sides of equal dimension. Since this would not allow for any distraction with axial rotation, another embodiment would include an even-sided geometrically shaped polygon with opposing faces at progressively increasing dimensions along a line that is perpendicular to each of them. Another embodiment would be an odd-sided geometrically shaped polygon with the face and its opposing edge at progressively increasing dimensions along a line from the face to the edge and that is perpendicular to the face engaged for distraction.

FIG. 1 illustrates a geometric polygonal insert with different gap widths or distances between the three sets of opposing parallel faces, in accordance with an embodiment of the present invention. The polygonal insert 100 has a hexagonal cross-sectional shape, with varying dimensions between its faces that can measure a range of the bone gap distances from 8 mm to 50 mm. For the geometric inserts, the preferred embodiment is one with an even number of faces, oriented such that opposing faces are parallel to each other. A further embodiment also includes an odd number of faces but with parallel orientation for gap measurement or an odd number of faces with different gap widths between each face and the opposing polygonal apex point of contact.

Figure 2:
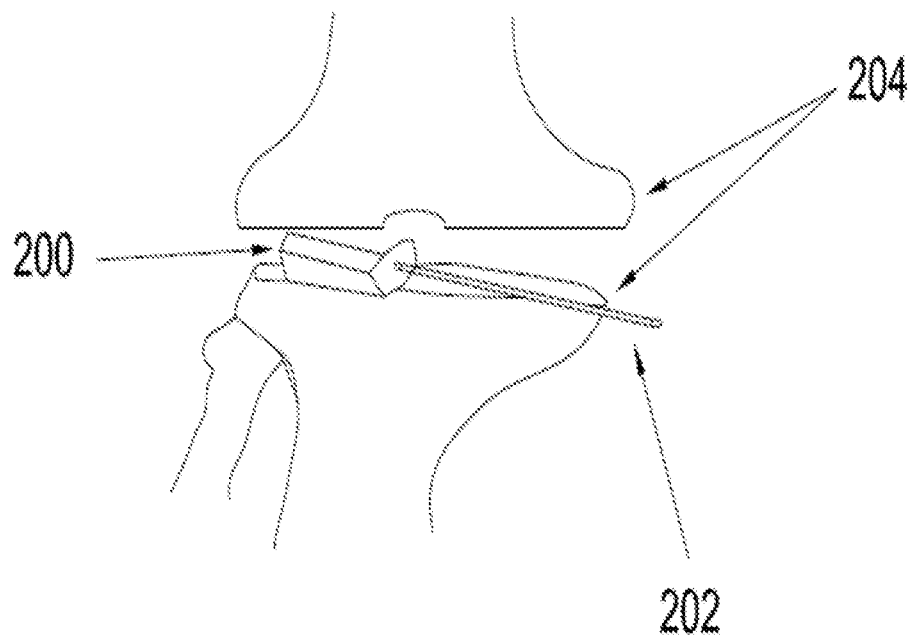
FIG. 2 represents an illustrative example of a geometric polygonal insert for measuring the lateral bone gap in the specific use-case scenario of a Total Knee replacement (TKR) surgery.

FIG. 2 represents an illustrative example of a geometric polygonal insert for measuring the lateral bone gap in the specific use-case scenario of a Total Knee replacement (TKR) surgery. A rotatory handle 202 is attached to the polygonal insert 200 at its axial location which is used to rotate the insert between the two bony elements 202, 204. Since, the distance between the two opposing surface varies, therefore with each rotation the bone elements are distracted with incremental gaps. The insert 200 is rotated through the rotatory handle 202 by forearm supination, thereby providing graduated and pre-determined distraction of the two bones to the desired soft tissue tension and balance. When the desired tension is achieved, the gap can be measured by calculating the distance between two opposing edge of the insert. The varying dimensional arrangement of the insert and the rotatory handle permits insertion into the bone gap even with the knee cap in its articulated position.

The design of the inserts is handed-based to accommodate left and right handed surgeons. The insert distracts the bone surfaces when a right handed user supinates the rotatory handle in a clockwise direction whereas a left hand user supinates the rotatory handle in anti-clockwise direction. In its right-hand use mode, supination of the insert results in distraction. For a left handed operation mode, the rotatory handle is inserted into the opposite end of the insert. Supination of the left forearm will result in bone distraction when the handle is attached at the opposite end of the insert.

Baseplate

In an embodiment of the present invention, the system may further comprise a baseplate. The baseplate is used with the insert for measurement of gap between two bony element and the controlled distraction of these elements. The insert can either be used in conjunction with or independently of a baseplate. The baseplate can be of varying length, width, thickness and shape based on the use-case scenario. The baseplate has two surface: the first surface rests on the bone surface while the upper surface is used to position an insert. In an embodiment, the baseplate comprises grooves or rails on the upper surface. These grooves or rails provides insertion means for multi-piece insert device and their rotation along the axis for measuring the bone gap and distraction of two bony elements. A first component of multi-piece insert device fits into the groove provided on the baseplate whereas other components attached to the first component so that they can be rotated over the first component. The baseplate can be a uni-rail grooved or a multi-rail grooved depending on the use case scenario. The uni-rail grooved baseplate has a one groove for housing the multi-piece insert, whereas in case of multi-grooved baseplate a plurality of multi-piece insert devices can be used to distract the bone surfaces. The desired insert at any particular stage can be used independently or in conjunction with the grooved baseplate. The bottom surface of the baseplate may comprise attachment points for attaching one or more augments to alter the thickness of baseplate in order to accommodate different use case scenario.

In another embodiment of present invention, the baseplate device has two components: top component and the bottom component that can be moved in relation to each other. The gap between the top component and the bottom component acts as a rail in which insert can be placed and either rotated, levered or advanced in rail to move the components relative to each other. The non-fixed baseplate device may have single set of components or two sets of components.

In an embodiment, the baseplate device can be fixed or non-fixed. In fixed device the position of two components are fixed with relative to each other. In fixed baseplate device, it can have a single set of components or can have two sets of components with their relative position fixed on the device. Whereas in non-fixed baseplate device, there is no constraint on the position of components.

Figure 3A:
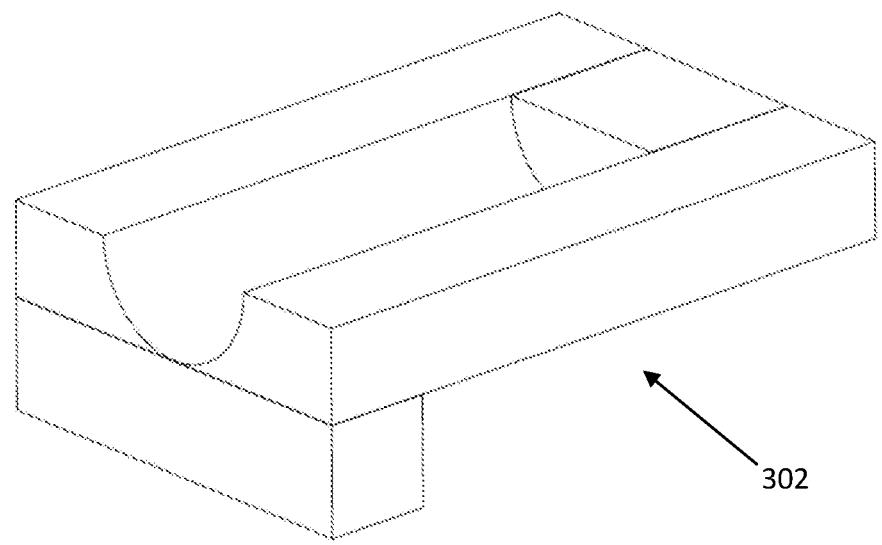
FIG. 3A shows a uni-rail grooved baseplate in accordance with an embodiment of present invention.

FIG. 3A shows a uni-rail grooved baseplate in accordance with an embodiment of present invention. The multi-piece insert structure comprises a first part: a cylinder which gets placed into the groove 302 and the second part: a geometrical structure which gets fir on the upper surface of the cylinder. The bottom portion of the uni-rail grooved baseplate is designed according to bone surface anatomy.

Figure 3B:
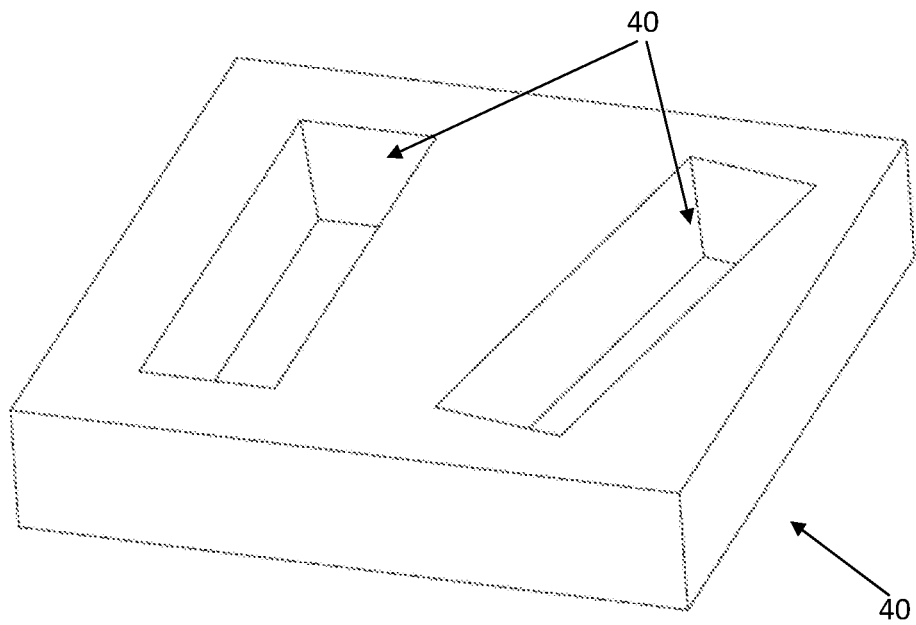
FIG. 3B shows a bi-railed grooved baseplate in accordance with an embodiment of the present invention.

FIG. 3B shows a bi-railed grooved baseplate in accordance with an embodiment of the present invention. The bi-railed grooved baseplate 400 comprises two grooves 402 placed either parallel, vertical or at a particular angular orientation. The baseplate is placed on the bone element and grooves are used to place an insert so as to allow gap measurement and controlled distraction of bone elements.

The uni-rail and bi-rail baseplate is available in different configurations. The first configuration is directly placed onto the cut bone surface for the aforementioned purpose(s). The second configuration is a modified platform that fits within the trial or implanted component of a commercially available primary joint replacement system. A third configuration is designed for use in revision replacement procedures with the ability to augment and adjust the thickness of the medial and lateral sides of the platform, either individually or collectively, to accommodate for associated bone loss and recreating the desired height of the new joint surface.

The above mentioned configuration(s) may be used in the trialing phase with trial non-implantable components or in the definitive/confirmatory phase with the actual implanted component In an embodiment, the baseplate can have in-rail configuration with insert placed in the rails present on the surface of components or it can have on-rail configuration, where the insert is placed on the rails. The bi-railed platform configures an in-rail space to generate a predefined driver space and to accommodate any guide insert into the in-rail space. For example, the in-rail system is designed to distract bone surfaces in a controlled manner for purpose of stretching light ligaments which have been surgically released, such as during knee replacement surgery. The in-rail system includes a bi-railed platform that is placed onto a tibial bone surface to minimize the penetration of a prybar into the softer bone surface. The baseplate has a configuration that is modified to fit within a tray of the bone surface and has a lateral rail. The system is used with a modular built-up inserts that facilitates gap measurement during knee flexion with the patella anatomically in place.

The bi-rail grooved baseplate may be used in either a left or a right orientation. For a TKR use-case, the perpendicular straight rail remains on the right (medial) side for a right knee in the correct usage. However, when flipped, the rail is on the left side and is in the left knee use configuration. The lateral rail groove can be designed to form an angle between 30 and 60 degrees in order to allow access into the lateral compartment with the knee in flexion. The angle of the lateral rail groove permits insertion of either the geometric insert, the non-geometric insert or a 'prybar' insert with the knee cap is in its anatomic location.

In an embodiment of present invention, the top and bottom surface of the baseplate are aligned in a non-parallel fashion to provide distraction between two bones with non-parallel bone anatomy.

In another embodiment of present invention, the baseplate has a curved or contoured surface that matches the typical bony anatomy in the scenario of its use thereby increasing the contact area for force transfer to the adjacent bone.

In an embodiment, the baseplate is used with a geometric insert. These inserts include a mechanism of interaction and engagement with the groove of the baseplate. Since the baseplate is present, the angle of rotation for use with these particular inserts is limited to 90 degrees. One simple embodiment of these inserts is a geometrically shaped polygon with all engaging sides of equal dimension from the central axis of rotation. Since this would not allow for any distraction with axial rotation, another embodiment would include a geometrically shaped polygonal surface that engages with the bone being distracted. In this case each adjacent face is at a progressively increasing dimension along a perpendicular line from the center of rotation of the insert to each face. In one embodiment, there are an even number of engaging faces through a 90 degree arc of insert rotation. In another embodiment, there are an odd number of engaging faces through the same arc of rotation.

In another embodiments, the insert is non-geometrical shaped and is based on a spline or circularized geometries and for purposes of this description are non-faced, non-edged, non-angular cross-sectional geometries. The simplest of these embodiments would be one with a circular cross-section. Since this would not allow for any distraction with axial rotation, another embodiment would be a cross-section with a constant or variable increase in radial length with progressively increasing angle of rotation. The cross-sectional description(s) of all these embodiments are infinite as the length of distraction is based on two instantaneous points of contact on the bone surfaces. The above embodiments may be used independently, i.e without a baseplate. However a second set of embodiments for these non-faced, non-edged, non-angular cross-sectioned inserts allows for the use of a baseplate. These inserts include a mechanism of interaction and engagement with the groove of the baseplate.

In another embodiment, the insert is based on using a levering action to apply a distraction force. One embodiment of such an insert would be a simple prybar designed with a smoothened/widened surface(s) at the fulcrum point and the opposing bone to prevent subsidence during distraction. The mechanism of use would entail levering the prybar on its fulcrum point causing the short end to engage and distract the opposing bone.

Figure 4:
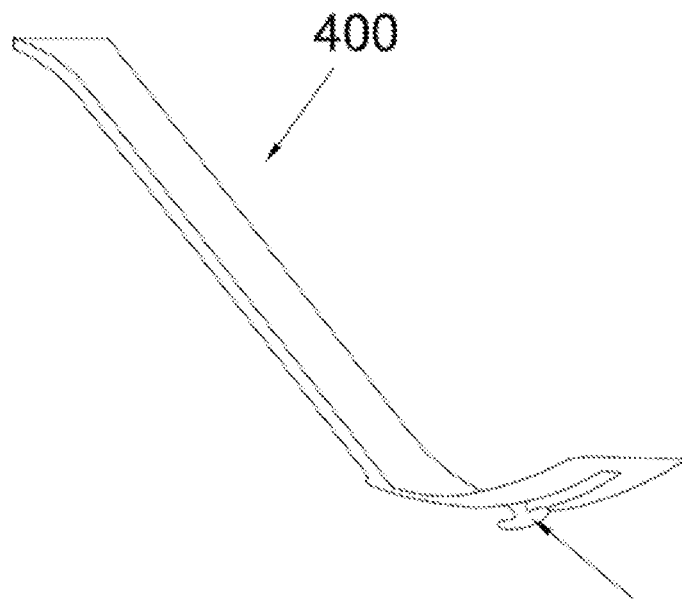
FIG. 4 shows a non-geometric modified 'prybar' insert with a sliding swivel knob in accordance with an embodiment of present invention.

FIG. 4 shows a non-geometric modified 'prybar' insert with a sliding swivel knob in accordance with an embodiment of present invention. The 'prybar' insert 400 is introduced into the bone gap in order to apply gradual and incremental distraction force between the two bone surfaces with a levered application of force. Similar to the rotation of a geometric insert, the applied distraction force allows the surgically released ligament to lengthen under controlled tension. The surgeon can perform further surgical releases following the stretching of the ligament until the desired length and/or tension of the ligament is achieved. The 'prybar' insert has a smooth rounded insertion end to avoid penetration into the bone on the upper surface, a sliding pivot knob 402 that facilitates the device to apply controlled distraction force between the bone surfaces and a blunted under-surface to avoid point loading the bottom bone at the fulcrum point.

In another embodiment the prybar is used with a baseplate. The baseplate could be similar to the one described above (railed grooved). Another embodiment of a prybar-specific baseplate is one that has a concentric interface with the prybar. This would allow the user to place the prybar in a specific location and apply distracting forces in a controlled fashion.

The groove allows for advancement of the insert to any depth and subsequent application of distracting force at that location.

In one use-case, the rails receive the sliding pivot of the non-geometric 'prybar' insert. In another use-case, the rails can receive any embodiment or modification of a geometric insert.

The method of use places the bi-rail grooved baseplate in contact with the bottom bone surface to protect it from associated bone collapse due to force application from the chosen insert. During the bone distraction operation, the sliding pivot knob fits into either rail groove of the bi-rail platform. The combination of the sliding pivot and the rail grooves and allow the surgeon to control the location of the distraction site and prevents slippage of the fulcrum.

Figure 5:
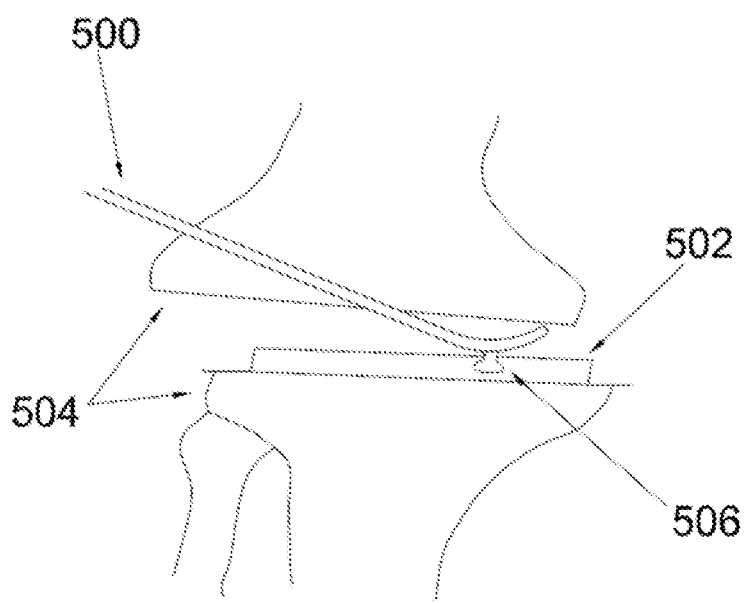
FIG. 5 illustrates a 'prybar' insert engaged in bi-rail baseplate to distract a tight bone gap.

FIG. 5 illustrates a 'prybar' insert engaged in bi-rail baseplate to distract a tight bone gap. After the surgical release, the insert is used to safely distract the uneven bone surfaces to make the bone gap symmetric. As shown in the FIG. 5, the 'prybar' insert 500 is introduced into the bone gap 504 in order to deliver a controlled distraction force between the two bone surfaces. The prybar insert 500 is used with a baseplate 506 which has a groove placing the swivel knob 506 of the prybar insert 500. The controlled distraction force allows the surgically released ligaments to lengthen under controlled tension. To achieve a desired tension of the ligament, the surgeon can repeat the process of the surgical release following the stretching of the ligaments.

In another embodiment of present invention, insert with a variable cross-sectional geometry along the longitudinal axis is used to distract the bone elements. When the insert advances between the elements, the bone distraction occurs. The mode of distraction of two bony elements using the insert can be through advancement, rotation, and/or levering. These could either be wholly independent, i.e. one mode of use only, or used in conjunction with each other, i.e. advancement and rotation, advancement and levering, rotation and levering, or all three together.

For all inserts above that apply distraction by axial rotation, one configuration would enable an equal increase in distraction per given degree of rotation. Another embodiment would provide variable or unequal distraction distance per given degree of rotation. Another embodiment would provide uniform distraction with variable degrees of rotation.

FIGS. 6A and 6B show exemplary configuration of insert with a combination of quarter polygon and a cylinder to be used with a baseplate for bone gap measurement and bone gap distraction system in accordance with an embodiment of present invention. The system includes a platform 600 with a hemi cylindrical groove 602. 6A shows a multi-piece insert where a polygonal attachment 604 to a cylinder 606 fits into the hemi-cylindrical groove 602. A smooth cam attachment to a cylinder can also fit in the hemi-cylindrical groove The structure in FIG. 6B shows the insert having a polygonal attachment 608 with the cylinder 610 fitted on the hemispherical groove. The structure when placed between two bone elements can be used to measure the gap between those elements. The configuration 612 shows how the flat portion of the polygon measures a gap between bone two bone surfaces into the which the combined platform and polygon-cylinder is placed. For demonstration purposes, assuming the distance between the bone surfaces is 15 mm. The configuration 614 shows how rotation of the cylinder 45 degrees clockwise exposes a different flat portion of the polygon to the bone surface. The distance between two bony elements assuming to be 18 mm. The configuration on the right 616 shows rotation 45 degrees clockwise further. This flat portion of the polygon assuming to be measured 21 mm. By inserting the combined platform and polygon-cylinder, using the configuration 612, 614 and 616, the distance can be measured between the bony elements in range from 15 to 21 mm. A variety of dimensions of the polygon-cylinder permit measurement of small gaps to very large gaps.

FIG. 7 shows alternative embodiment wherein the attachment to the cylinder is cam shaped. The configuration 702 in FIG. 7A has a cam shaped attachment with increasing radius. The configuration 704 attachment of FIG. 7B has steps like arrangement. With each rotation there will be an increase in the height of the insert. In the-configuration 706 of FIG. 7C, the insert is amorphous with varying height.

FIGS. 7D and 7E illustrate change in height of insert with the rotation. In the configuration 708 FIG. 7D, the small dimension of the cam is placed between two bone surfaces. Rotating the cylinder 90 degrees clockwise, as shown in configuration 710, FIG. 7E, increases the distance between the bone surfaces, thereby distracting them in a smooth and controlled manner.

Figure 8A:
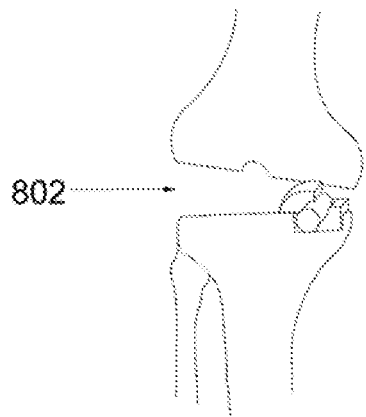
FIGS. 8A and 8B show the use of cam shaped attachment with cylinder and the grooved plate for distracting the bone surface.
Figure 8B:
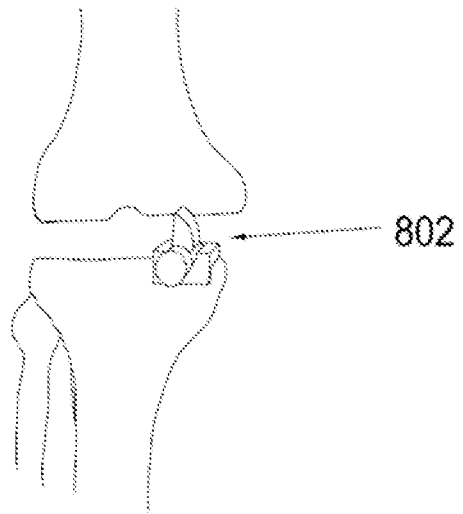

FIG. 8 shows the use of cam shaped attachment with cylinder and the grooved plate for distracting the bone surface. FIG. 8A shows insertion of the insert on the lower bone element with small dimension of cam 802. FIG. 8B shows the cam 802 rotated by 90 degrees, the distance increases and bone distraction happens. The rotation of insert can be done by manual rotation of cylinder.

Figure 9:
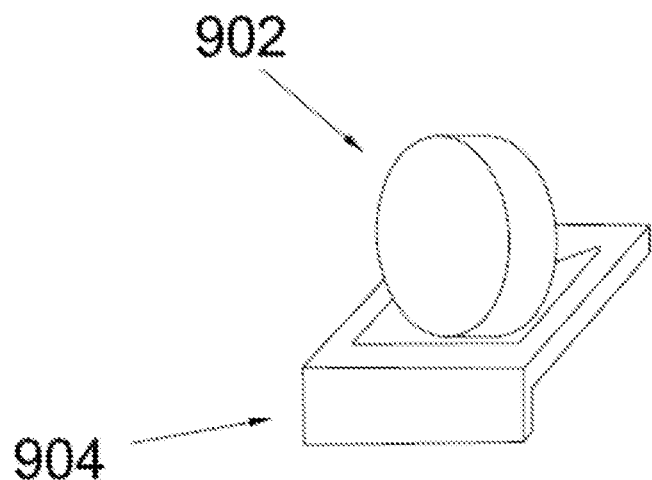
FIG. 9 shows alternate embodiments of inserts that can be used similarly for bone distraction.

FIG. 9 shows alternate embodiments of inserts that can be used similarly for bone distraction. The insert is a single piece device where an elliptical shaped cam 902 is placed on a concave platform 904. The cam is free to rotate with the platform. Rotation of lesser diameter to larger diameter will distract bone surfaces.

The type and size of the insert may be chosen according to the joint and the gap being measured. In one use case scenario, a non-geometric insert may be used solely (i.e without a grooved baseplate) for soft tissue tensioning in the native baseline anatomic state (i.e. prior to any bone cuts or soft tissue manipulation or release). In another use case, a geometric insert may be used for bone gap measurement after one or both bones are cut. In yet another use case, the gap measurement may be performed with either geometric insert or non-geometric insert or amorphous insert at any stage of the procedure for the purpose of ascertaining soft tissue tensioning and/or assisting in the adjustment of that tension for correct side-to-side ligament balancing. The aforesaid process and the valuable information allows the surgeon to balance the ligaments without successive bone cuts.

In the TKR-specific use case, eversion or lateral dislocation of the patella is not required for access to either the medial or lateral compartment in flexion or extension, as the inserts can be introduced into the bone gap without altering the anatomic position of knee cap. Further, the insert can be inserted between the bone gaps when the knee is in a flexed and/or extended position to provide measurement of the flexion and/or extension gap, respectively.

In the specific case where joint reconstruction requires equal tensioning of soft tissue structures in multiple locations or positions, this system may be used to balance the necessary structures via graduated haptically-based release by sequentially detaching or lengthening the tight structure (s) in a controlled manner. This would rectify an asymmetric bone gap and allow for multi-position soft tissue balance for joints that require motion postoperatively and avoiding complete disruption of the ligaments.

In the use case for an ALIF, once the desired bone distraction is achieved then the measured distance between the two bones determines the dimensions of the fusion device to be used or implanted.

In the use case of a TKR, once the distal femur and proximal tibia cuts are made, the method comprises of creating a medially and laterally haptically-balanced bone gap in extension, followed by placing the required inserts medially and laterally onto a bi-railed baseplate to recreate that same haptic balance in flexion, with the patella in its anatomical location. These steps may be performed with or without a railed groove and a cam that can be either geometric or non-geometric in design. Once the flexion-based soft-tissue tensioning is complete, the method applies a modified instrument to the baseplate that reproduces the distraction distance from extension and allows femoral component sizing at that precise and specific distraction distance. Another embodiment of the modified instrument would allow for surgeon alteration in component size and gap distance. Dimensions of proprietary or commercially available knee replacement instruments are incorporated to allow for use of the manufacturer-specific femoral cutting guides in the determination of rotation and sizing of that component.

In an embodiment, the present invention provides an instrument assembly or a bone distraction device having a Motion Creating Bi-Surface mechanism (MCBSM) for precise measurement of bone gap and distraction of bone in a controlled manner. The bone distraction device is designed broadly for use on the skeletal system including but not limited to the spinal column, knee, hip, ankle, shoulder, wrist, articulating, and non-articulating structures. The invention provides a tool performing Motion Creating Bi-Surface Mechanism (MCBSM) to expand a bi-compartmental structure. The bone distraction device comprises a baseplate having a uni-compartmental or a bi-compartmental configuration. In uni-compartmental configuration, one compartment for providing bone distraction at a single point of contact is provided. The bi-compartmental configuration has two separate independent liftable compartments which can be used simultaneously to distract two different surfaces. Each of the compartment has two active surfaces: a bottom base in form of the baseplate and a top plate between which a force is applied to move the surfaces in relation to each other for providing precise measurement of bone gap and distraction of bone in a controlled manner. The top plate is configured to move up and down to a certain dimension. The bottom base and the top plate have arrays that provide bi-directional expansion mechanism. Additionally, the control mechanism of the present invention provides for applying direct and/or measured/graduated separation force between the two surfaces and able to deliver haptic and sensor-based feedback to the surgeon for the critical ligament tensioning and balancing aspects of the procedure. When a force is applied in between the Bottom base and the top plate, the active surfaces move incrementally in relationship to each other.

Figure 10:
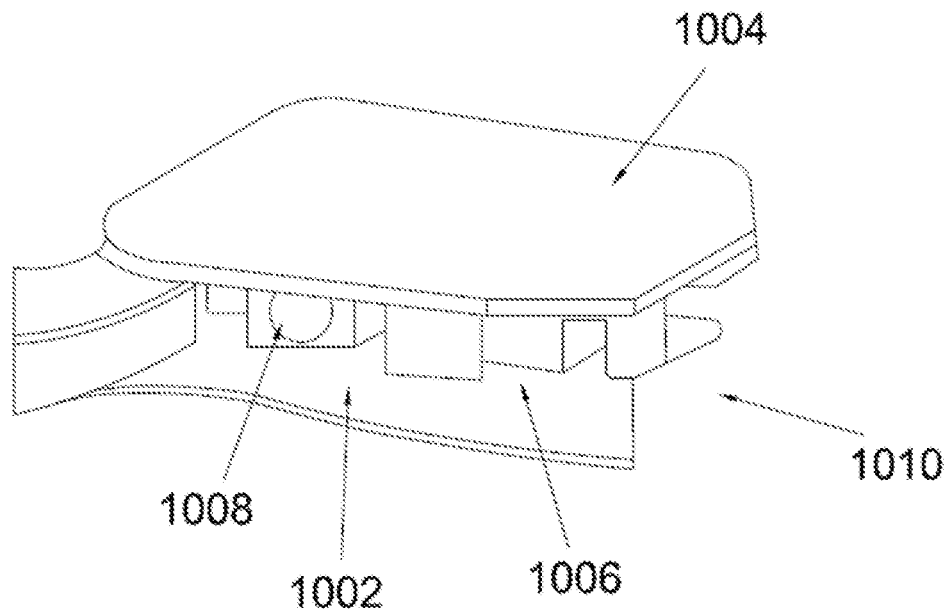
FIG. 10 illustrates a uni-compartment configuration of a bone distraction device in accordance with an embodiment of the present invention.

FIG. 10 illustrates a uni-compartment configuration of a bone distraction device in accordance with an embodiment of the present invention. The bone distraction device 1010 has a baseplate 1002 and a top plate 1004 positioned on the bottom base 1006. A housing 1008 is present between the baseplate 1002 and the top plate 1004 for placing an insert to provide levering, rotating or advancement mechanism for expansion of the bone distraction device. The uni-compartment bone distraction device 1010 is used in use cases where two bone surface has to be aligned or distracted.

Figure 11:
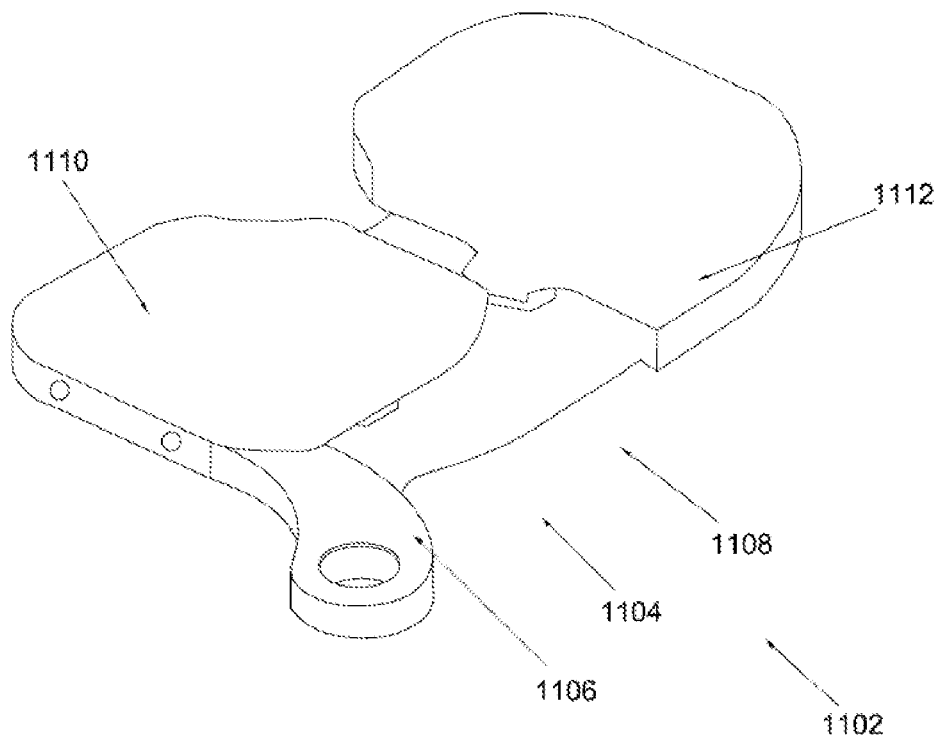
FIG. 11 illustrates a bi-compartment configuration of a bone distraction device in accordance with an embodiment of the present invention.

FIG. 11 illustrates a bi-compartment configuration of a bone distraction device in accordance with an embodiment of the present invention. The bone distraction device 1102 has a baseplate 1104 having a first compartment 1106 and a second compartment 1108. The first compartment 1106 has a first top plate 1110 and the second compartment 1108 has a second top plate 1112. The positioning and orientation of the first compartment 1106 and the second compartment 1108 on the baseplate 1104 are designed according to the site of usage. The first compartment 1106 and the second compartment 1108 are oriented in medial and lateral configuration for use in Knee replacement surgery. The first compartment 1106 has means for advancing an insert from front and the second compartment 1108 has place for advancing the insert laterally. The bi-compartment device is stacked to match the assessed gap and insert. The insert used for lifting the top plate can be a prybar or a cam-shaped insert. With each lift, the top plate moves linearly at a pre-determined length. The bone distraction device has a locking and unlocking mechanism. For unlocking or disengaging the device, the top plate is lifted to a tiny bit to take the load off the mechanism and push the toggle arm in unlock position.

In an embodiment, the relative movement of active surfaces can be Linear or Uniplanar expansion, i.e. contraction along the Z-Axis. In this movement both the bottom base and the top plate remains parallel to each other and move in a direction perpendicular to the main axis. In another embodiment, the relative movement between the bottom base and the top plate can be Angular translation along any defined or random axis, rotational translation along the Z-axis or Linear translation in XY plane. In movement of angular translation along any defined or random axis, there is a motion between the bottom base and the top place whereby their parallelism changes in an angular fashion. In movement of Rotational translation along the Z-axis, the motion occurs between the bottom base and top plate, in which both the active surfaces remain parallel to each other with a fixed distance between them but rotate about a defined axis that is perpendicular to the active surfaces. In the movement of Linear translation in XY plane, the motion occurs between both the active surfaces whereby they remain parallel to each other with a fixed distance between them. In another embodiment, the movement between two surfaces can be combination of above described movement either sequentially or simultaneously. The expansion movement between the bottom base and the top plate is bi-directional and incremental.

The instrument assembly or the bone distraction device comprises a bottom base and a top plate interacting with each other at an engagement zone. Each of the bottom base and the top plate has two sub-surfaces: an external sub-surface is the zone of interaction between the device and the body part upon which it is applying its mechanism of action; and an internal sub-surface which are in engagement with each other to incorporate the mechanism creating the desired motion between the bottom base and the top plate at their zone of engagement with each other. The bone distraction device has a housing means between the bottom base and the top plate in which an insert is placed to provide movement between the bottom base and the top plate either by rotational mechanism, or by levering mechanism or by advancement into the instrument assembly. The insert enable movement between the bottom base and the top plate at their zone of engagement. The movement between the bottom base and the top plate is bidirectional and is incrementally controllable.

In an embodiment, the interaction zone between the device and the body part may comprise one of more of features, such as: geometric or non-geometric shape; flat or curved surface; solid or hollow; uniform or variable or varied thickness; uniform homogenous or composite heterogeneous structure; anti-slip coating etc.

In another embodiment of present invention, the external sub-surface of the bottom base and the top plate can be pre-contoured so as to accommodate on the bone surface based on the type of surface on which it is being used. The pre-contouring of external surface can be done based on the specific use case, such as bone-specific; joint-specific; anatomy specific; patient specific; laterality specific; procedure specific; implant specific; size specific or a combination thereof.

In an embodiment of present invention, the bone distraction device comprises an array of toggles that incrementally control surface movement of the top plate with respect to the bottom base. The device may comprise a bi-toggle mechanism whereby there are two independent toggle array or a multi-toggle mechanism whereby the bottom bases has multiple toggle array in which more than two toggle array are used for movement of the two active surfaces.

Figure 12:
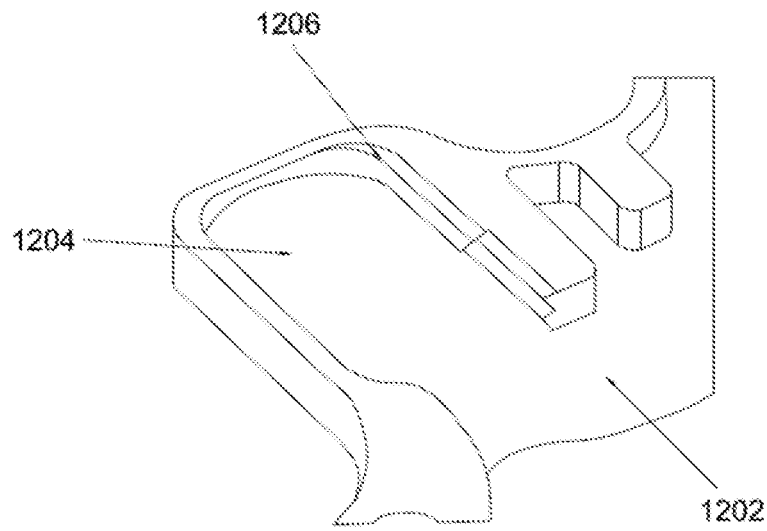
FIG. 12 shows the internal configuration of the bottom base of the bone distraction device in accordance with an embodiment of the present invention.

FIG. 12 shows the internal configuration of the bottom base of the bone distraction device in accordance with an embodiment of the present invention. The bottom base 1204 is a compartment specific part of a baseplate 1202. The bottom base 1204 has segregated cuts on the lateral wall of the bottom base 1204. The segregated cut are in form of separate step zones 1206 configured to engage or receive toggles placed on the top plate. The step zones are arranged or offset in relation to each other in a specified manner to achieve the inter-surface motion. The bottom base 1204 shown in FIG. 12 has bi-toggle mechanism in which there are two step zones for engaging two toggles on the top plate. Each step zone engages one toggle of the top plate at a given time. A separation force is applied between the two surface for allowing activation of the toggle mechanism.

Figure 13:
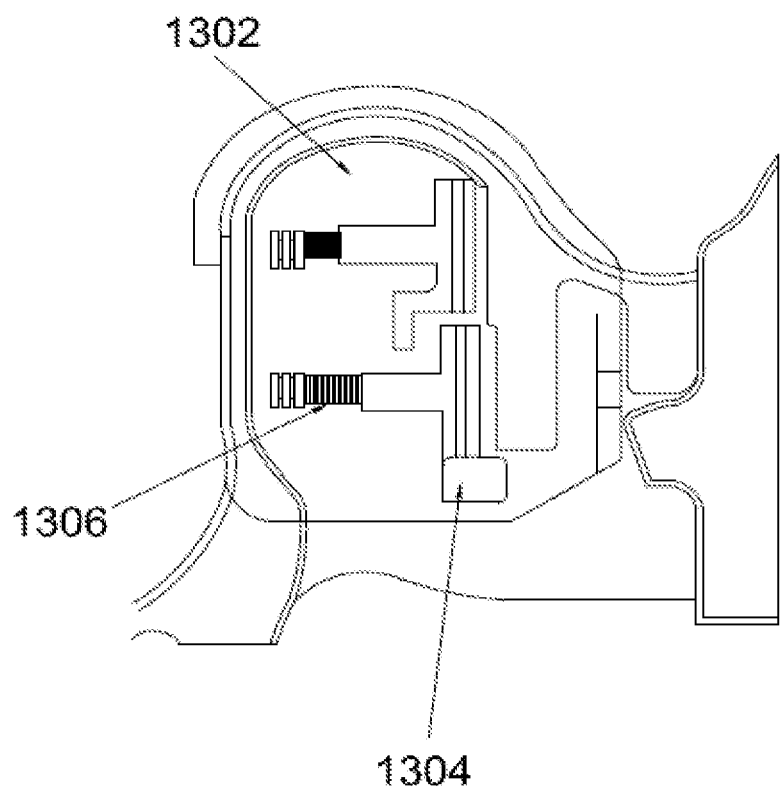
FIG. 13 shows the internal configuration of the top plate of the bone distraction device in accordance with an embodiment of the present invention.

FIG. 13 shows the internal configuration of the top plate of the bone distraction device in accordance with an embodiment of the present invention. The top plate 1302 comprises separate toggle 1304 with a specified geometry arranged in relation to each other to achieve the inter-surface motion. Each toggle 1304 independently moves and engages with the step zones 1206 of the bottom base 1204. The top plate 1302 has a spring loaded mechanism 1306 configured to achieve and maintain toggle engagement with the step zone. The device also comprises a locking and unlocking mechanism to allow maintaining or releasing the toggle from the step zones.

The movement of the bottom base and the top plate happens at the engagement zone. The incremental control of the active surface movement in relation to each other happens via articulation of an array associated with the internal sub-surface of bottom base with matching geometrized array on the internal sub-surface of the top plate in the engagement zone. In an embodiment, the array consists of steps and toggles. Illustratively, the array of matching geometry on the internal sub-surface of the bottom base engages with an array of matching geometry on the internal sub-surface of the top plate in a pre-determined and controlled fashion thereby enabling incremental linear expansion between the bottom base and the top plate when activated. In an embodiment the step or toggle array comprises definite shape, size, dimension, number, engagement surface and arrangement. The step or toggle array also comprises a locking mechanism to hold the toggle in activated or engages position. In alternative embodiments, the array may comprise a combination of steps and steps on both the bottom base and the top plate, alternatively, the array map comprise gears on both the active surfaces. It should be noted that a person skilled in art understands a numerous combinations of array are possible so long as they enables the desired motions between the two plates.

Figure 14A:
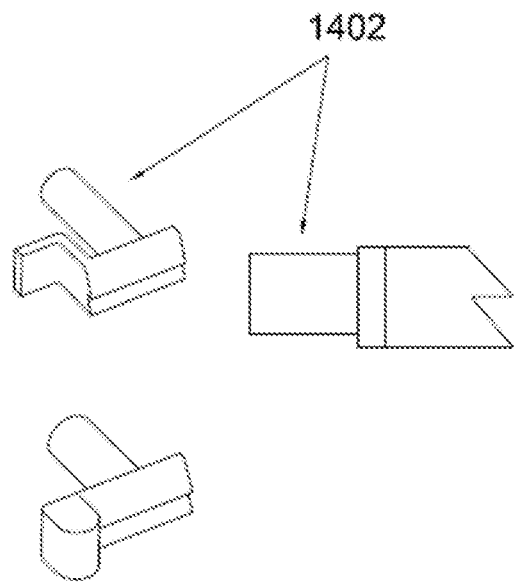
FIGS. 14A and 14B shows a toggle and positioning of toggle on segregated cuts in the bottom base of the bone distraction device in accordance with an embodiment of present invention.
Figure 14B:
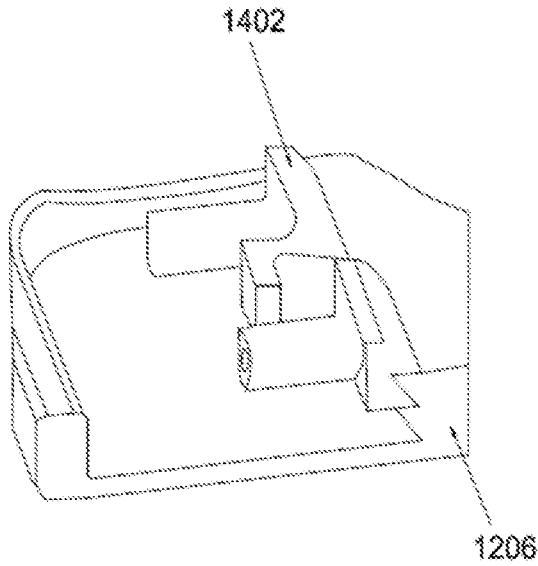

FIGS. 14A and 14B shows a toggle and positioning of toggle on segregated cuts in the bottom base of the bone distraction device in accordance with an embodiment of present invention. The top plate is loaded with one or more toggle 1402 wherein each toggle 1402 can independently move and engage with the step zone 1206 of the bottom base either independently or in conjunction with other elements/bodies; and linear expansion/contraction along with movements (angular/rotational/linear translation) depends upon specified design factors that include toggle geometry, toggle step height, step/toggle engagement zone offset and number of toggles The engagement zone is the area or region of array intersection between the bottom base and the top plate to allow for force transmission between them. In an embodiments, between the bottom base and the top plate one or more engagement zones are possible. The number of engagements zones that are load bearing and actively contributing to the mechanism of action of moving the top plate with respect to the bottom base at any given time can be one, two or multiple. The engagement zones on both the bottom base and the top plate are arranged or offset in relation to each other in a specific manner to achieve the desired motion. The interaction of array with the engagement zone can be either one array per zone, or one array articulating with many zones, or multiple arrays articulating with multiple zones, or multiple array interacting with single zone at any given time. The arrangement of array on the engagement zones on the active surfaces can be co-linear, parallel, Divergent, convergent, uniplanar, bi-planar, tri-planar, straight, curvilinear, curved, angles, fixed or variable.

In an embodiment, the interaction between the arrays on bottom base and the top plate can be independent, wherein each array independently interacts with another array in the engagement zone. The array may also engage sequentially, whereby one array is engaged at one time and in next step, another array engages. Alternatively, the arrays engage simultaneously. In another embodiments, the engagement of array is achieves and maintained with a spring loaded mechanism. In another embodiment an additional locking mechanism is used to allow maintaining or releasing the two active surfaces.

Figure 15:
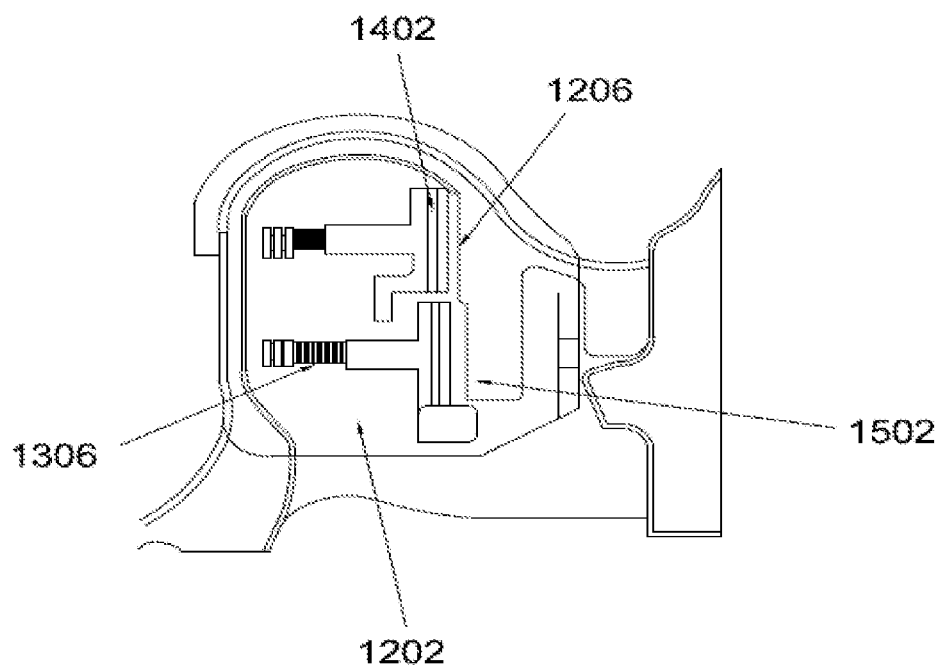
FIG. 15 illustrates a cross sectional view of the bone distraction device showing an engagement zone of toggle of top plate and the steps of bottom base in accordance with an embodiment of the present invention.

FIG. 15 illustrates a cross sectional view of the bone distraction device showing an engagement zone of toggle of top plate and the steps of bottom base in accordance with an embodiment of the present invention. The bottom base 1202 comprises separate step zones 1206 (stair case type arrangement) arranged in a specified manner to engage toggles 1402 and to achieve inter-surface motion between the top plate 1302 and bottom base 1202. The top plate 1302 comprises separate toggles 1402 having a specified geometry to move independently and engage with the step zone of the bottom base 1202. A spring-loaded mechanism 1306 along with lock/unlock mechanism is provided to achieve and maintain toggle engagement with the step zone. Additionally, the control mechanism of the present invention includes applying direct and/or measured/graduated separation force between the two active surfaces and able to deliver haptic and sensor-based feedback to the surgeon for the critical ligament tensioning and balancing aspects of the procedure. When a separation force is applied, the toggle starts moving upward over the step contoured on the bottom base. With each click, toggle moves one step upward, raising the top plate. The steps are designed to provide anti-slip surface, so that once the toggle has reached an upward step, it prevents slipping back to the lower step. The gap between two active surfaces can be changed under the control of the surgeon thereby changing the spacing between the two active surfaces of the muscular-skeletal system being distracted. In one embodiment, the gap corresponds to a thickness of one or more components to be implanted in the muscular-skeletal system. The insert is likely to be initially placed between the two surfaces having a minimum gap and then expanded to a predetermined height or thickness. The muscular-skeletal system is placed in a first relational position with the insert inserted between the two surfaces. The first relation position corresponds to the positions of the surfaces and portions of the muscular-skeletal system attached thereto.

In an embodiment, for providing movement between the bottom base and the top plate, a separation force is provided between the bottom base and the top plate. The mechanism of separation can be incrementally controlled or activated by engaging an insert that enables direct separation force between the bottom place and the top plate. The insert can function by different action, for instance, force generated by levering a prybar or using a laminar spreader. A cam-shaped insert can be used which on rotation provides measured or graduated force between the bottom base and the top plate. In an embodiment, a torque wrench can be used as insert to provide haptic-feedback during force application. In an embodiment, the separation force using the insert can be applied manually or using an automatic or robotic control torque wrench or rotating cam. Sensor based controls can be used to control and providing feedback during force application.

FIG. 16 illustrates application of an insert to the bone distraction device for linear expansion in accordance with an embodiment of the present invention. A cam shaped insert 1604 is used with a torque wrench 1606, optionally automated or robotic, is used as an insert to provide separation force between the bone distraction device 1602. The cam shaped insert 1604 is used to provide graduated separation force. The design rationale includes equal toggle and base step heights 1404 (2 mm); separate zone 1302 of engagement with half and equal offset amount in both zones to attain uniform incremental change; bi-surface mechanism thickness; expansion range; and gap range. The torque wrench 1104 couplet to the cam is rotated which makes the EBSM 1006 to increase or decrease the gap between active surfaces.

In the embodiment of the present invention separate zones is offset 1 mm from each other in the direction of incremental movement to allow for sequential and complete engagement of the two different toggles. Only one toggle is engaged completely at any given time. For linear expansion/contraction of both active plates the toggle step height should be equal to the bottom base step height i.e. (Toggle step height=Bottom base step height). Two separate zones of engagement between the toggles of the top plate and the step architecture of the bottom plate. Each zone of engagement is offset by defined amount. If offset is ½ the toggle or bottom base step height, then incremental change will be uniform through the entire range of EBSM activation. If offset amount is equal in both zones then incremental change will be uniform. If offset amount is unequal in both zones, then incremental change will be variable with each toggle engagement. Toggle engagement with the bottom base steps is maintained via a spring-loaded mechanism.

The linearly expansion of both active plates for a specific case has Minimum Initial EBSM thickness of 6 mm, Maximum Initial EBSM thickness i.e. Expansion range=(Initial thickness−2) and Gap range=Initial thickness+Expansion range. Therefore, a 6 mm initial thickness EBSM can expand 4 mm, covering a gap range from 6 to 10 mm.

In an embodiment, the bone distraction device is design to incorporate features in the designs of arrays, the engagement zones and the bottom base and the top plate to ensure that they move in a pre-designated manner, such as linear expansion, angular expansion, rotatory expansion, translation expansion. During the engagement of the bone distraction device in the orthopaedic surgery, various factors contribute to the dimensional changes achievable throughout the engagement. The features of the range of engagement may comprise: initial thickness, starting dimension, absolute maximum thickness, incremental thickness, range. The bone distraction device is designed to accommodate the features on specific use case basis. For instance, range of thickness can be increased by increasing the number of steps in arrays, augments can be used on either the bottom base or top plate to increase initial thickness. In an embodiment, the bone distraction device can either used independently between two bony structure or it can be used in conjunction with other elements, such as a railed baseplate, a TJR component to enhance, direct or augment the mechanism.

In an embodiments, a locking mechanism is provided in the bone distraction device to prevent the sub-surfaces of the bottom base and the top plate from disengaging. The locking mechanism limits the separation of bottom base and the top plate at the end range. A reversible or gap-loosening mechanism is also provided in the bone distraction device to impart bi-directional expansion mechanism to the device.

FIGS. 17A and 17B illustrates a locking mechanism and a gap-loosening mechanism in accordance with an embodiment of the present invention. A locking handle 1702 is provided in the bone distraction device which is pushed to disengage the toggle 1402 from the steps 106 of the bottom base. When the device is unlocked state, the top plate falls to initial height and gap-loosening takes place.

In an embodiment, the bone distraction device can be used in multiple configuration based on the specific use-case basis, and the location type where it is intended to being used. It can be in fixed configuration, wherein the position of MCBSM is fixed. The device may have only single bone distraction compartment or it may have two bone distraction compartments on a baseplate. The position two distraction compartments on the single platform is fixed and they can be of equal thickness or variable thickness based on their specific use case.

In another embodiment, the configuration can be non-fixed, in which there is no constraint on the position of bottom base and the top plate. It can have a single compartment on the platform or have two bone distraction compartments on the same platform.

Figure 18:
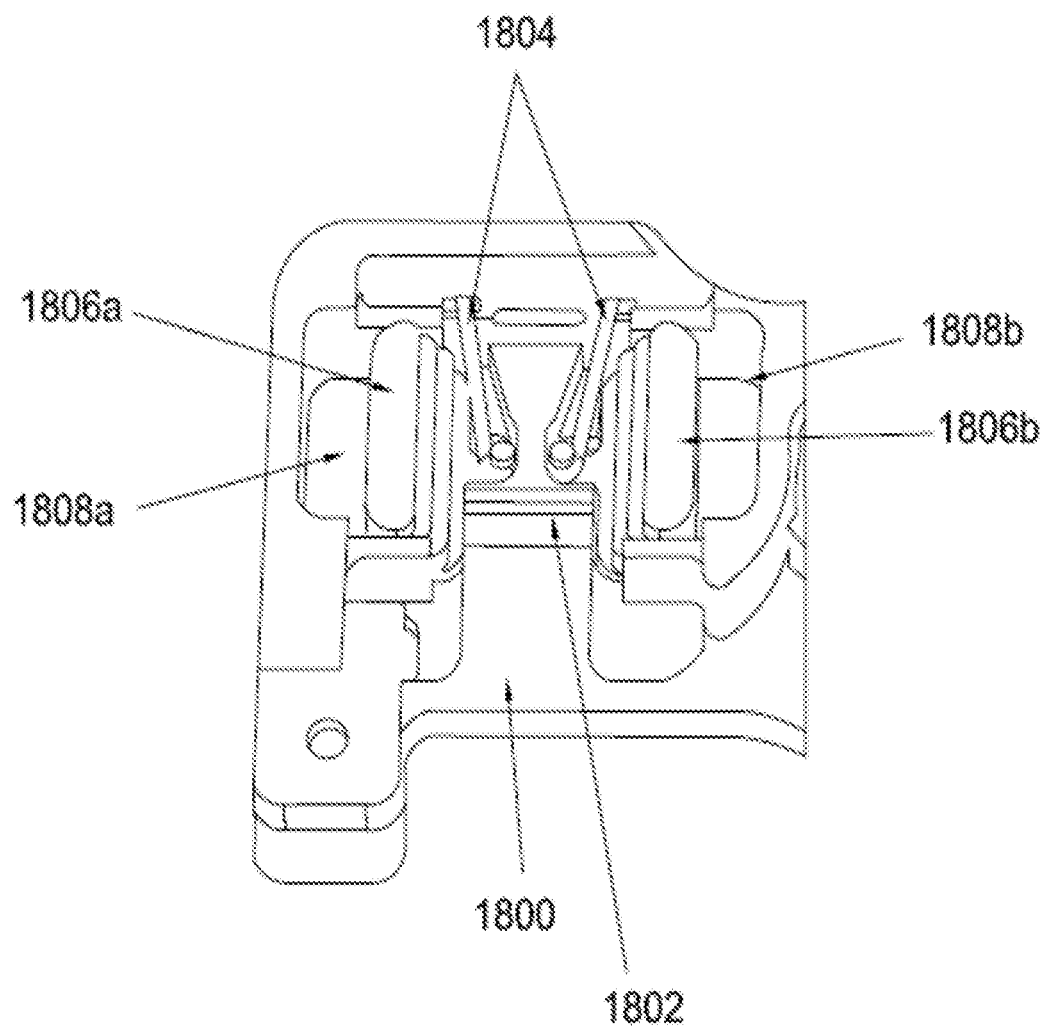
FIG. 18 shows alternate configuration of a bottom base of a bone distraction device in accordance with an embodiment of present invention.

FIG. 18 shows alternate configuration of a bottom base of a bone distraction device in accordance with an embodiment of present invention. The bottom base 1800 has a projection of an array of steps 1802 on front section which engages with steps on a top plate. The array of steps 1802 are connected to a spring mechanism 1804 at the back of bottom base. The spring is connected to a plurality of fins on the left side 1808*a* and right side 1808*b* behind the array of steps. A pair of grooves is adjacent to the fins so that as the spring expands, the plurality of fins extends in the left groove 1808*a* and right groove 1808*b* respectively.

Figure 19:
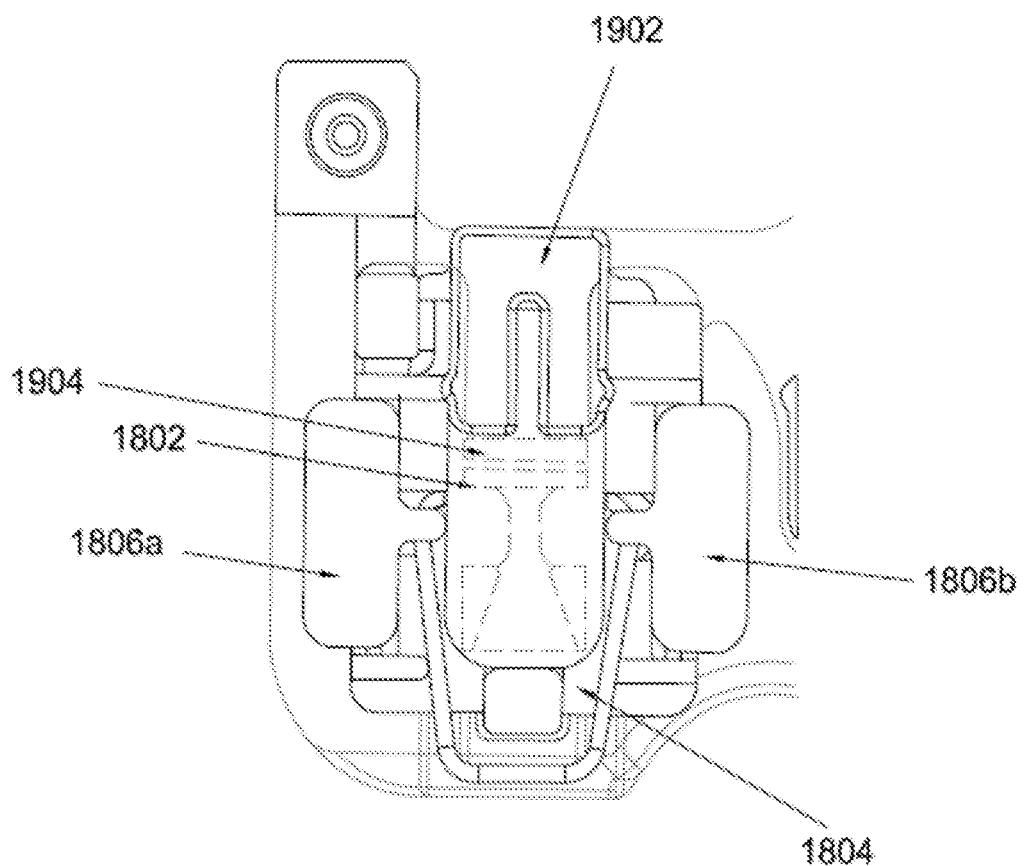
FIG. 19 shows a bottom view of alternate configuration of a bone distraction device in accordance with an embodiment of present invention.

FIG. 19 shows a bottom view of alternate configuration of a bone distraction device in accordance with an embodiment of present invention. The bone distraction device comprises a top plate 1902 having arrays 1904 engaged with the engagement zone having array of steps 1802 on the bottom base. When a separation force is applied between the top plate 1902 and the bottom base 1800, it expands the spring 1804 which is engaged with plurality of fins on the left side 1806*a* and the right side 1806*b*. As the spring 1804 expand, it elevates the distance between two fins, thus elevating the top plate with respect to the bottom base.

The type and size of the bone distraction device may be chosen according to the joint and the gap being measured. In spinal vertebral surgery, a bone distraction device with a single compartment or bi-compartment may be used for equivalent or differential vertebral column adjustment depending on the site of surgery.

In hip arthroplasty, a single linearly expanding curved-curved mechanism may be used to ascertain optimal liner thickness or neck length. In another embodiment, a bone distraction device with two compartments can be used to ascertain liner thickness or neck length and Femoral stem lateral offset.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Numerous modifications and alternative embodiments of the invention will be apparent to those skilled in the art in view of the forgoing description. Accordingly, this description is to be construed as illustrative only and is for the purpose of teaching those skilled in the art the best mode of carrying out the invention. The details of the system may be varied substantially without departing from the spirit of the invention, and the exclusive use of all modifications which are within the scope of any subsequent claims is reserved.

The invention claimed is:

1. A system for providing haptic-based gap measurement between two elements, said system comprising:
   a bottom base having an array on walls of the bottom base;
   a top plate having a geometrized array matching with the array of the bottom base, wherein internal faces of said top plate and the bottom base engage in an engagement zone to provide a mechanism creating a desired motion between the top plate and the bottom base;
   an insert for applying a separation force between the bottom base and the top plate to move the top plate in relation to the bottom base;
   a spring-loaded mechanism configured to engage the array on the top plate and the bottom base to provide controlled displacement force; and
   a sensor-based control and feedback system configured to monitor and regulate the separation force applied between the bottom base and the top plate.

2. The system of claim 1 wherein a movement of the top plate in relation to the bottom base is bi-directional and incremental.

3. The system of claim 2, wherein the movement between the top plate and the bottom base is Linear expansion, Angular translation rotational translation, linear translation or combination thereof.

4. The system of claim 1, wherein an outer surface of the top plate and the bottom base are designed in geometric or nongeometric shape, flat or curved, uniform or variable thickness, solid or hollow configured in shape to accommodate a surface on bones.

5. The system of claim 1, wherein an outer surface of the top plate and the bottom base is coated with anti-slip material.

6. The system of claim 1, wherein a movement between the top plate and the bottom base is through articulation of the array on the bottom base with the matching geometrized array on the top plate.

7. The system of claim 1, wherein the array on the bottom base comprises of step in form of segregated cuts or gears.

8. The system of claim 1, wherein the geometrized array on the top plate comprise toggles or steps in form of segregated cuts or gears.

9. The system of claim 1 wherein the bottom base and top plate has two or more than two sets of arrays.

10. The system of claim 9, wherein each array on the bottom base interacts independently with each array on the top plate.

11. The system of claim 9, wherein the arrays on the top plate and the bottom base engage sequentially or simultaneously.

12. The system of claim 1, wherein the insert provide direct displacement force between the top plate and the bottom base.

13. The system of claim 1 further comprising a locking mechanism to allow locking and disengaging of arrays on the top plate and the bottom base.

14. The system of claim 1, wherein the insert is a prybar or a rotating cam insert.

15. The system of claim 1 further comprising an automatic cam or torque wrench to provide separation force.

16. The system of claim 1 wherein the bottom base has two compartments having different top plates.

* * * * *